(12) United States Patent
Kismarton

(10) Patent No.: US 11,414,213 B2
(45) Date of Patent: Aug. 16, 2022

(54) LOW COST, HIGH PERFORMANCE, MULTI-HEAD DRILL AND FILL MACHINE

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/786,777

(22) Filed: Feb. 10, 2020

(65) Prior Publication Data
US 2021/0245895 A1 Aug. 12, 2021

(51) Int. Cl.
*B64F 5/10* (2017.01)
*F01D 25/28* (2006.01)
*B25B 5/00* (2006.01)

(52) U.S. Cl.
CPC .............. *B64F 5/10* (2017.01); *F01D 25/285* (2013.01); *B25B 5/003* (2013.01); *B25B 5/006* (2013.01)

(58) Field of Classification Search
CPC .......... B64F 5/10; F01D 25/285; B25B 5/006; B25B 5/003; B25B 39/161; B21J 15/142; B21J 15/10; B21J 15/28; B21J 15/30; B21J 15/02; B21J 15/14; B23P 2700/01; B23B 39/161
See application file for complete search history.

(56) References Cited

U.S. PATENT DOCUMENTS

| | | | |
|---|---|---|---|
| 2,559,248 A * | 7/1951 | Harcourt | B21J 15/14 29/243.53 |
| 2,638,662 A * | 5/1953 | Rothwell | B21D 28/265 29/34 D |
| 3,534,896 A * | 10/1970 | Krynytzky | B21J 15/14 227/51 |
| 4,310,964 A | 1/1982 | Murphy | |
| 4,967,947 A * | 11/1990 | Sarh | B21J 15/14 227/156 |
| 4,995,119 A | 2/1991 | Codkind | |
| 5,163,793 A * | 11/1992 | Martinez | B21J 15/10 269/309 |
| 5,203,855 A | 4/1993 | Givler | |
| 5,615,474 A * | 4/1997 | Kellner | G05B 19/41815 29/703 |
| 7,076,856 B2 * | 7/2006 | Sarh | B21J 15/10 29/524.1 |
| 2017/0333976 A1 * | 11/2017 | Varrelmann | B21J 15/142 |
| 2018/0126514 A1 * | 5/2018 | Moriarty | B05B 13/005 |
| 2018/0304417 A1 * | 10/2018 | Koelsch | B26F 1/44 |
| 2019/0001398 A1 * | 1/2019 | Varrelmann | B64F 5/10 |
| 2021/0086914 A1 * | 3/2021 | Varrelmann | B23Q 41/04 |

FOREIGN PATENT DOCUMENTS

EP 1151813 A1 11/2001

* cited by examiner

*Primary Examiner* — Mahdi H Nejad
(74) *Attorney, Agent, or Firm* — Felix L. Fischer

(57) ABSTRACT

A manufacturing system employing a bifurcated backbone having an upper plate and lower plate, with a longitudinal slot between the upper and lower plate. A plurality of actuator groups are mounted longitudinally adjacent the slot. A carrier supports a panel for longitudinal translation into the slot and the carrier is configured to pulse longitudinally in the slot relative to the plurality of actuator groups during a sequence of fabrication operations by the plurality of actuator groups on the panel.

20 Claims, 18 Drawing Sheets

LOW COST, HIGH PERFORMANCE, MULTI-HEAD DRILL AND FILL MACHINE

BACKGROUND INFORMATION

Field

This disclosure relates generally to the field of structure fabrication systems and, more particularly to a drill and fill machine having a plurality of actuator stations aligned for linear pulsed flow operation on a structural element.

BACKGROUND

Manufacturing of commercial aircraft and other large scale structures are typically modularized to accommodate assembly operations. Using commercial aircraft as an example, numerous structural elements need to be riveted assemblies, often with thousands of rivets. The assemblies must be drilled to accept the rivets, the rivets inserted and then bucked. For automated manufacturing many typical operations include highly complex robotic heads with three dimensional positioning capability and end effectors in the head employing multiple tool systems including automated vision systems for positioning, drilling systems, rivet or fastener feed systems, and rivet squeeze or bucking systems. To accommodate differing fastener size requirements with a common robotic head, automated tool changers are typically employed. The cost and complexity of such system are both high. Additionally, with drilling and insertion of fasteners on an individual basis, even with robotic systems, the time required typically produces only 5-7 completed fasteners per minute. Completion of a riveted assembly with several thousand rivets may take 10 hours or more. It is therefore desirable to provide a low cost, low complexity system for rapid throughput of assemblies.

SUMMARY

Exemplary implementations provide a manufacturing system employing a bifurcated backbone having an upper plate and lower plate, with a longitudinal slot between the upper and lower plate. A plurality of actuator groups are mounted longitudinally adjacent the slot. A carrier supports a panel for longitudinal translation into the slot and the carrier is configured to pulse longitudinally in the slot relative to the plurality of actuator groups during a sequence of fabrication operations by the plurality of actuator groups on the panel.

The exemplary implementations provide a method for fabrication of a panel by inserting a panel in a multi-head drill and fill (MDF) machine having a bifurcated backbone with a longitudinal slot to receive the panel. The panel is clocked for alignment of a plurality of actuator groups with a stringer in the panel. The panel is longitudinally translated to a pulse position 1. A hole is drilled in the stringer and skin with each drill in the actuator groups. The panel is pulsed one position longitudinally to a pulse position 2 and a first rivet is inserted with each rivet feeder in the actuator groups and a second hole is drilled with each of the drills. The panel is pulsed longitudinally one position to a pulse position 3 and the first rivets are engaged and squeezed with each of the aligned squeezers and bucking bars in the actuator groups, a third hole is drilled with each of the drills and a second rivet is inserted with each of the rivet feeders. The panel is pulsed longitudinally one position to a pulse position 4 and a fourth hole is drilled with each of the drills, a third rivet inserted with each of the rivet feeders and the second rivets are engaged and squeezed with each of the squeezers and bucking bars. The panel is then pulsed longitudinally one position to a pulse position 5 and a fifth hole is drilled with each drill, a fourth rivet is inserted with each of the rivet feeders and the third rivets are engaged and squeezed with each of the squeezers and bucking bars. The panel is pulsed longitudinally one position to a pulse position 6 and a sixth hole is drilled with each drill, a fifth rivet is inserted with each of the rivet feeders and the fourth rivet is engaged and squeezed with each of the squeezers and bucking bars. The panel is pulsed longitudinally one position to a pulse position 7, each of the rivet feeders is activated for insertion of a sixth rivet and the fifth rivets are engaged the squeezed with each of the squeezers and bucking bars. The panel is pulsed longitudinally one position to a pulse position 8 and the squeezers and bucking bars are operated for squeezing of the sixth rivets.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a multi-head drill and fill (MDF) machine with a plurality of actuator groups, each actuator group having a drill, rivet feeder, and squeezer with aligned bucking bar in linearly adjacent position for sequential operation on a panel. The actuator groups are supported by a bifurcated backbone through which the panel is inserted with a carrier. The carrier incorporates a roller system engaging the panel for clocking. The carrier is longitudinally translatable for pulsed positioning at each actuator in the actuator group for simultaneous operation of that actuator in each actuator group.

Figure 1:
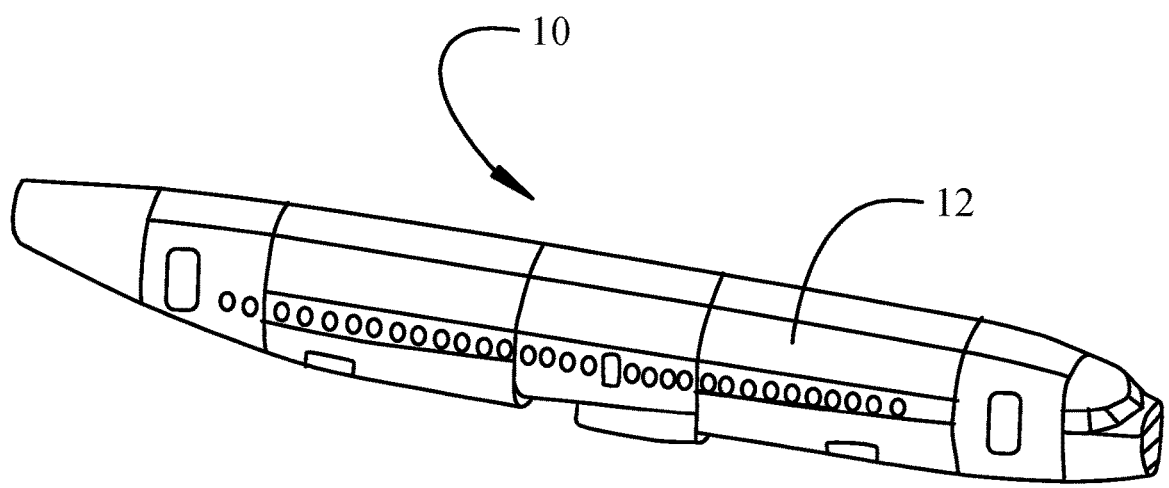
FIG. 1 is an example commercial aircraft fuselage with multiple panels included in the assembly.
Figure 2:
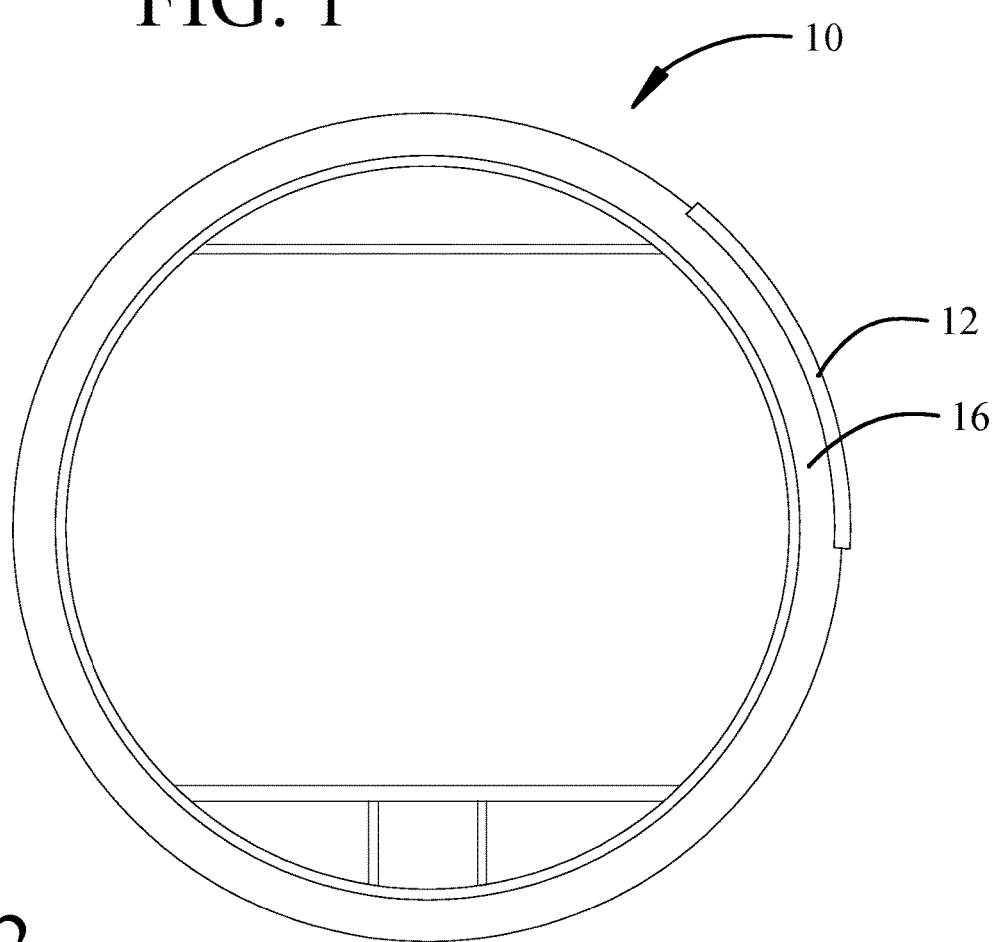
FIG. 2 is a cross section showing an example skin panel as placed in the fuselage.
Figure 3:
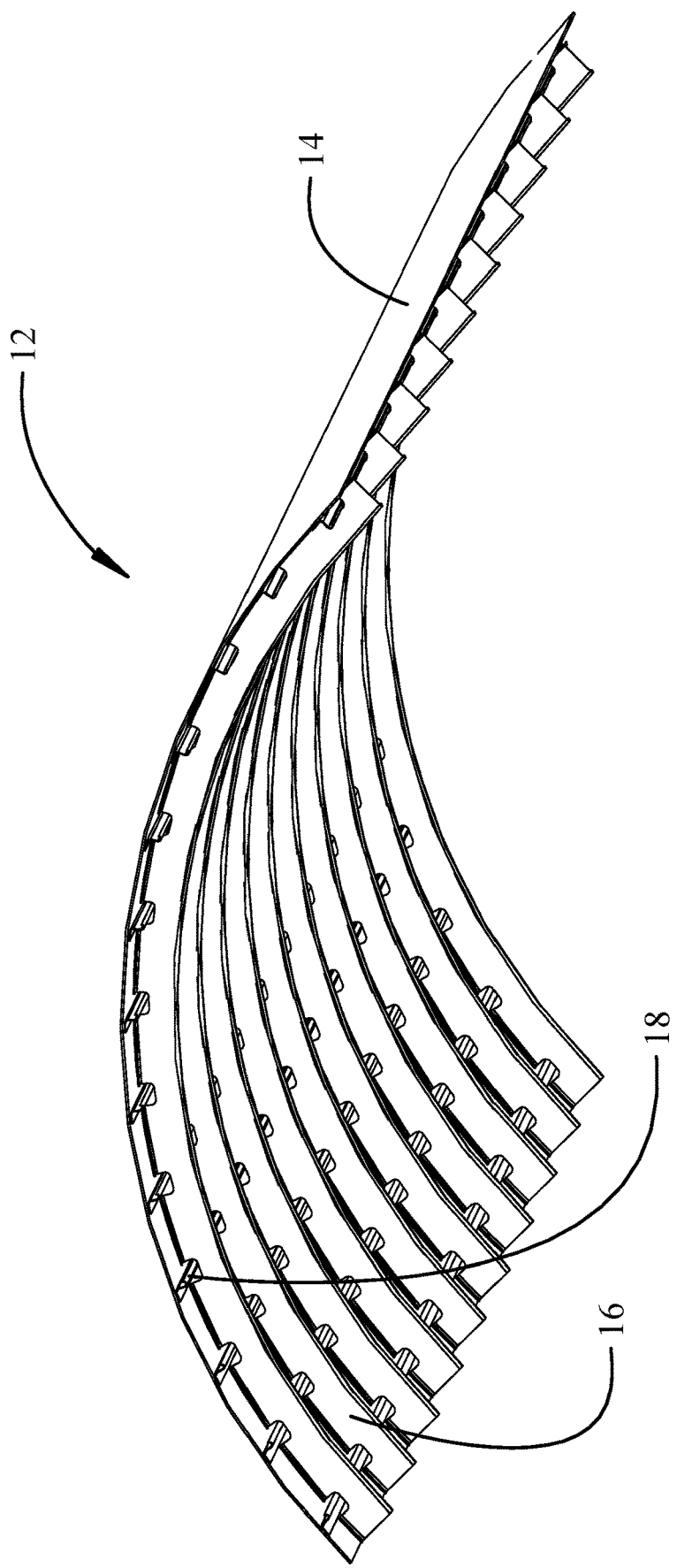
FIG. 3 is a detailed pictorial representation of the example skin panel.

Referring to the drawings, FIG. 1 shows an aircraft fuselage 10 having multiple skin panels 12 as an example of panels on which the present implementation may be employed for fabrication. FIG. 2 shows a cross section of the fuselage with one example panel 12 highlighted for clarity. Each panel has a skin 14 supported by a plurality of frames 16 and longitudinal stringers 18 as seen in FIG. 3. For fabrication operations employing the implementations described herein, the frames 16 and stringers 18 are adhesively bonded to the skin to maintain orientation and placement. Bonding of the frames 16 and stringer 18 provides a temporary fixed positioning of the elements of the panel 12 to allow precise drilling and fastening. Additionally bonding prior to the processing avoids debris such as chips, dirt, burrs or other process residue from being trapped between the skin 14 and the frames 16 and stringers 18.

Figure 4:
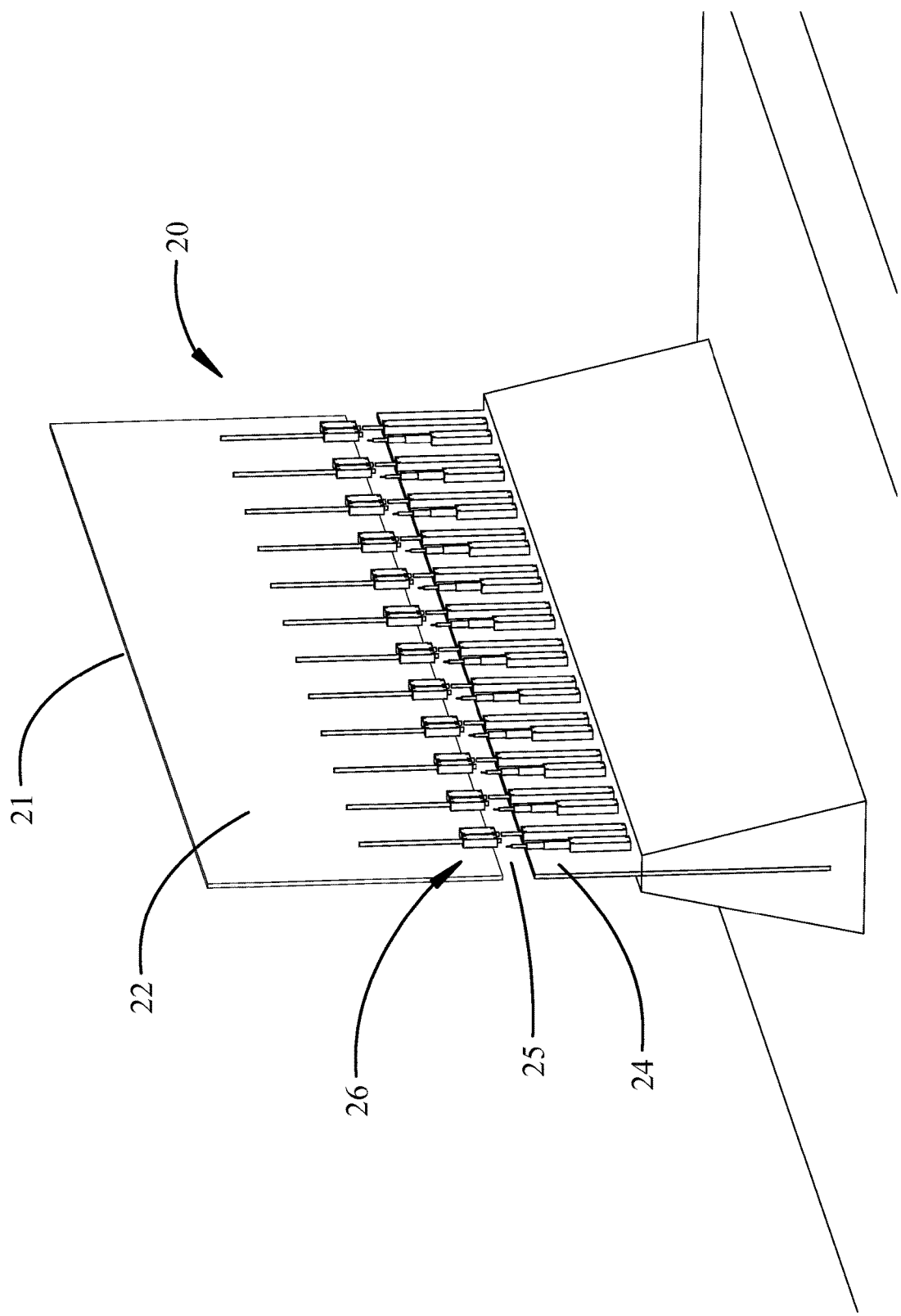
FIG. 4 is a pictorial representation of the support spine and actuators for use in a drill and fill station incorporating an example implementation.
Figure 5:
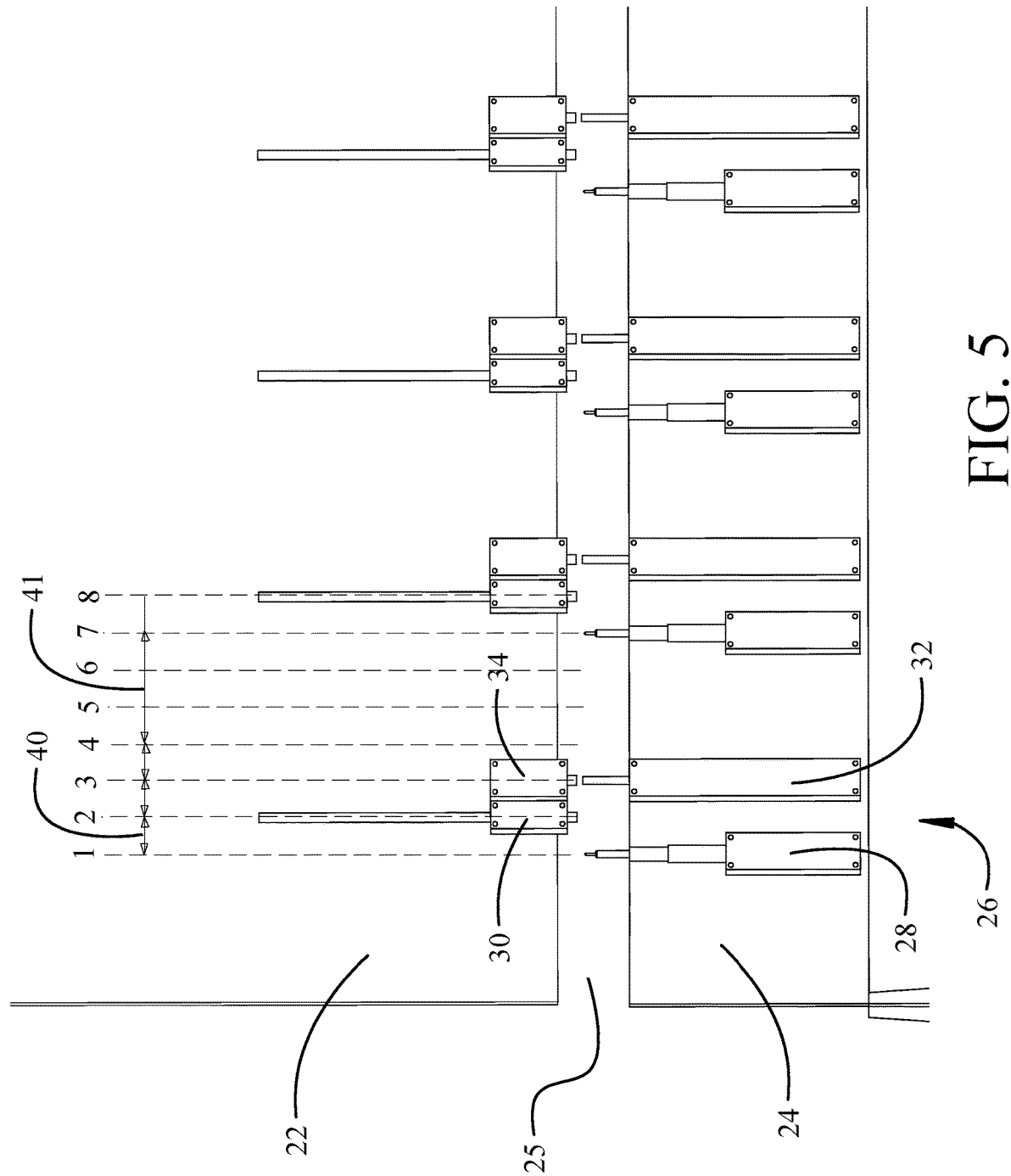
FIG. 5 is a detailed close up of example actuators employed in the implementation.
Figure 6:
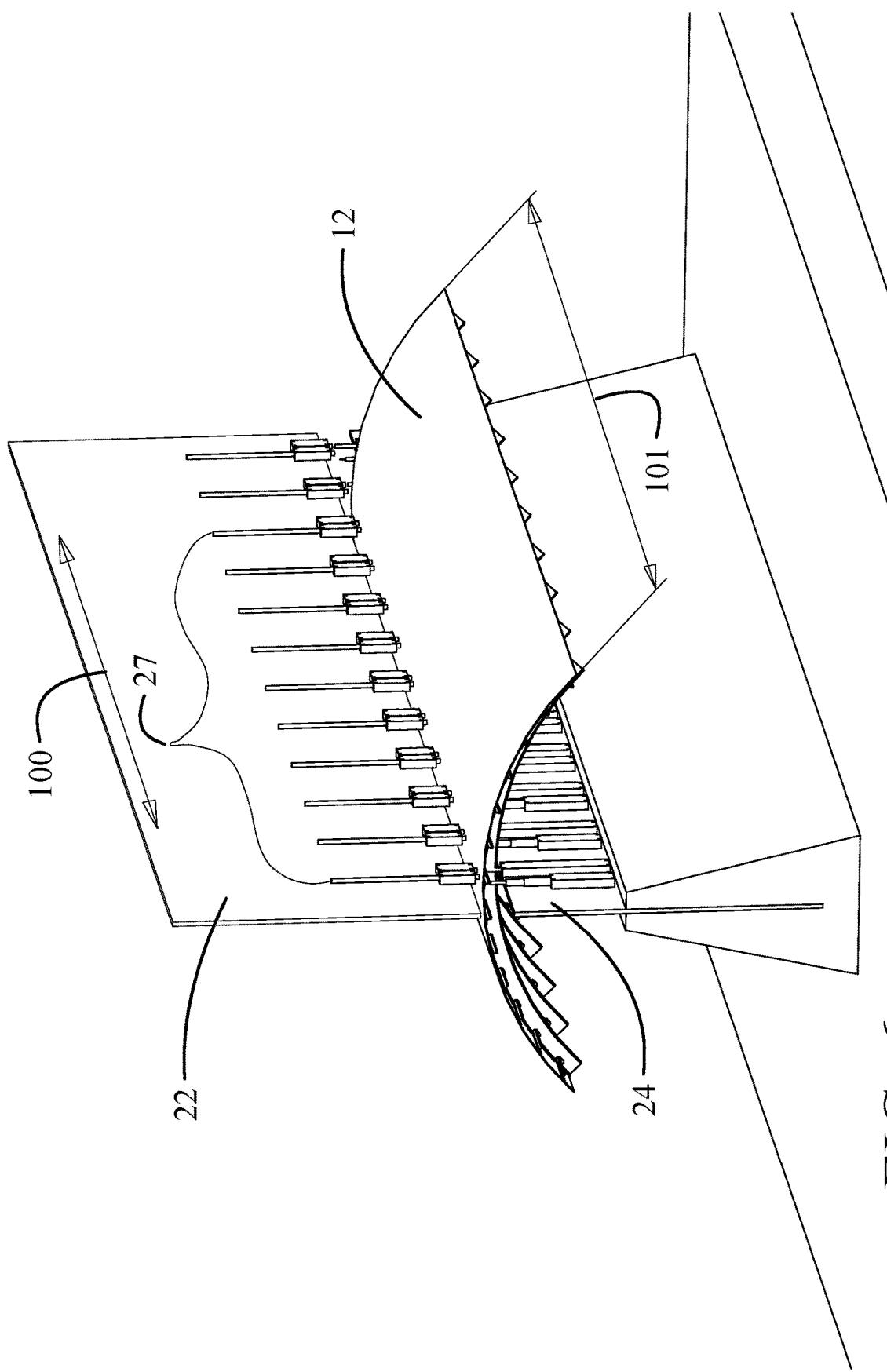
FIG. 6 is a pictorial representation of the panel engaged in the drill and fill station.
Figure 7:
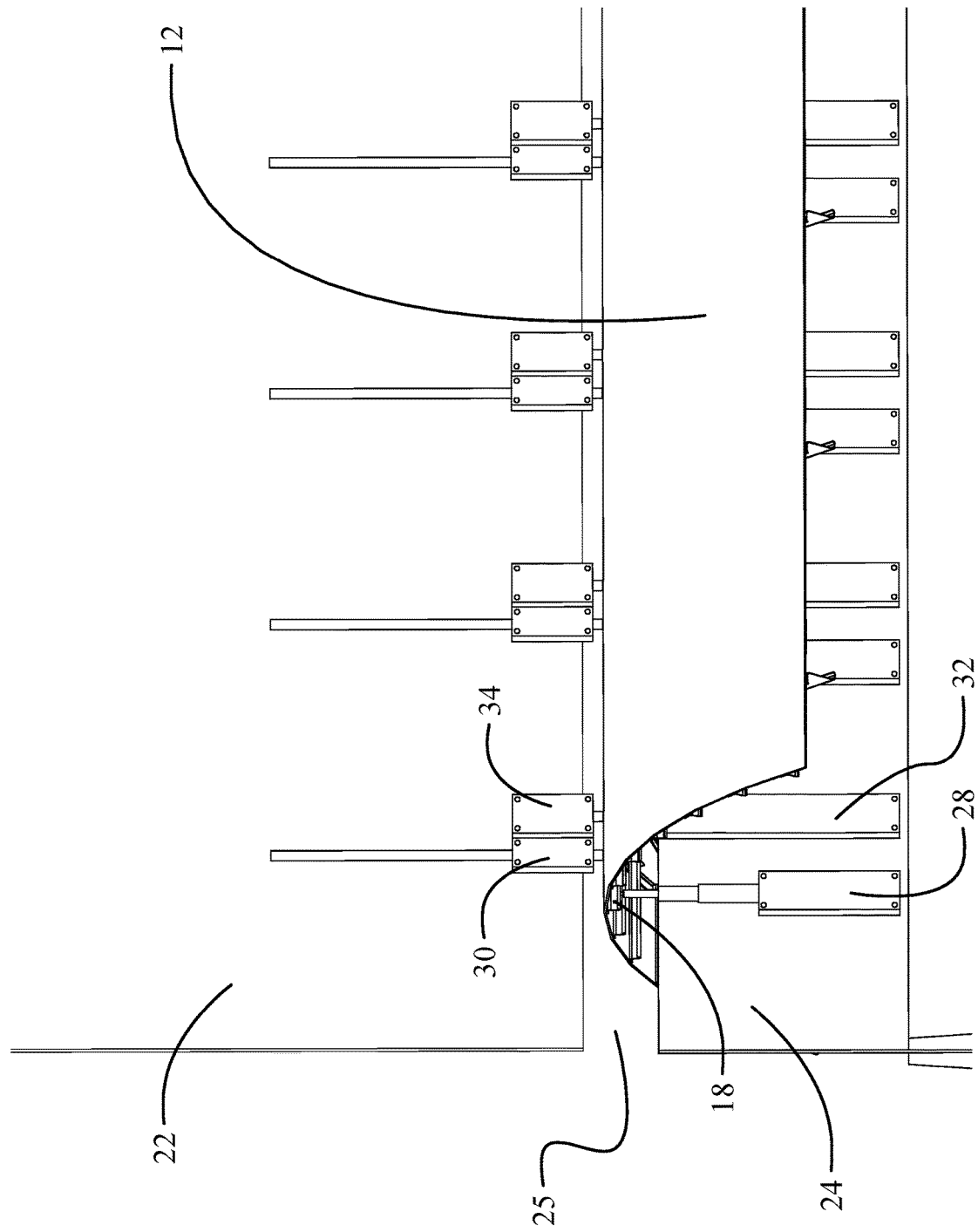
FIG. 7 is a close up pictorial representation of the engaged panel.
Figure 8:
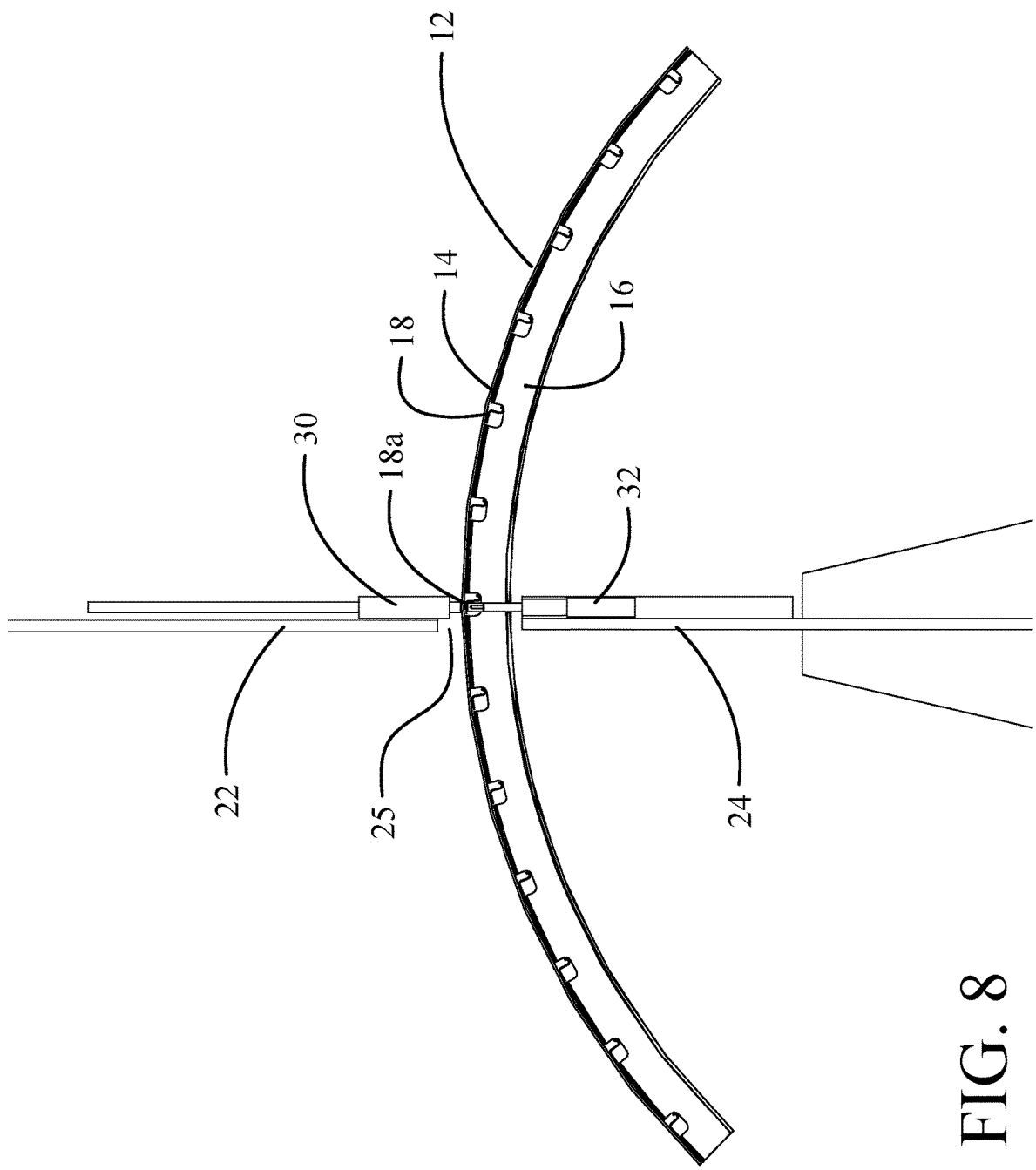
FIG. 8 is an end view of the engaged panel.

An example implementation of an MDF machine 20 is shown in FIG. 4. A bifurcated backbone 21 having an upper plate 22 and lower plate 24, with a slot 25 extending in a longitudinal direction (designated by arrow 100) between the upper and lower plate, provides a strong, stiff and stable structure supporting a plurality of actuator groups 26 mounted on the upper and lower plates adjacent the slot 25 and spaced longitudinally. In the example implementation, the backbone 21 is steel plate 1 inch thick, 28 ft long and 4 ft tall supported by 14 inch I-beam stiffeners 23 (attached to the plates on an opposite surface from the actuator groups as seen in FIG. 8 only) to maintain a delta Z of less than 0.005 in. per side during rivet squeeze, as will be described subsequently. In alternative implementations, the backbone 21 may be steel truss, aluminum plate, CFRP plate or similar rigid materials with C-channels or other stiffener configurations. For the example implementation, each actuator group 26 has a drill 28 mounted on the lower plate 24, a rivet feeder 30 mounted on the upper plate 22 and a squeezer 32 mounted on the lower plate 24 with aligned bucking bar 34 mounted on the upper plate 22 as seen in FIG. 5. The drills 28 are mounted on the lower plate 24 to allow chips and other debris to fall vertically. However, in alternative implementations the positioning of the various elements of the actuator groups may be reversed. For the example implementation the actuators are hydraulically operated. The actuators in each actuator group 26, the drill 28, rivet feeder 30 and squeezer/bucking bar (32, 34) function in a pulsed operation. A panel 12 is inserted into the slot 25 between the upper and lower plates 22, 24 of the backbone 21 as shown in FIGS. 6-9. As will be described in greater detail subsequently, a carrier 38 (seen in FIG. 12) supports the panel 12 and is configured for longitudinal translation into the slot 25 and is further configured to pulse relative to the slot in incremental predetermined pulse widths during the sequence of fabrication operations by the plurality of actuator groups 26 on the panel 12. The carrier 38 additionally clocks the panel 12 to a plurality of clocking positions relative to the plurality of actuator groups 26 with each clocking position providing alignment of the actuator group actuators with structural elements on the skin 14, stringers 18 for the example shown, for a fastener row.

Figure 9:
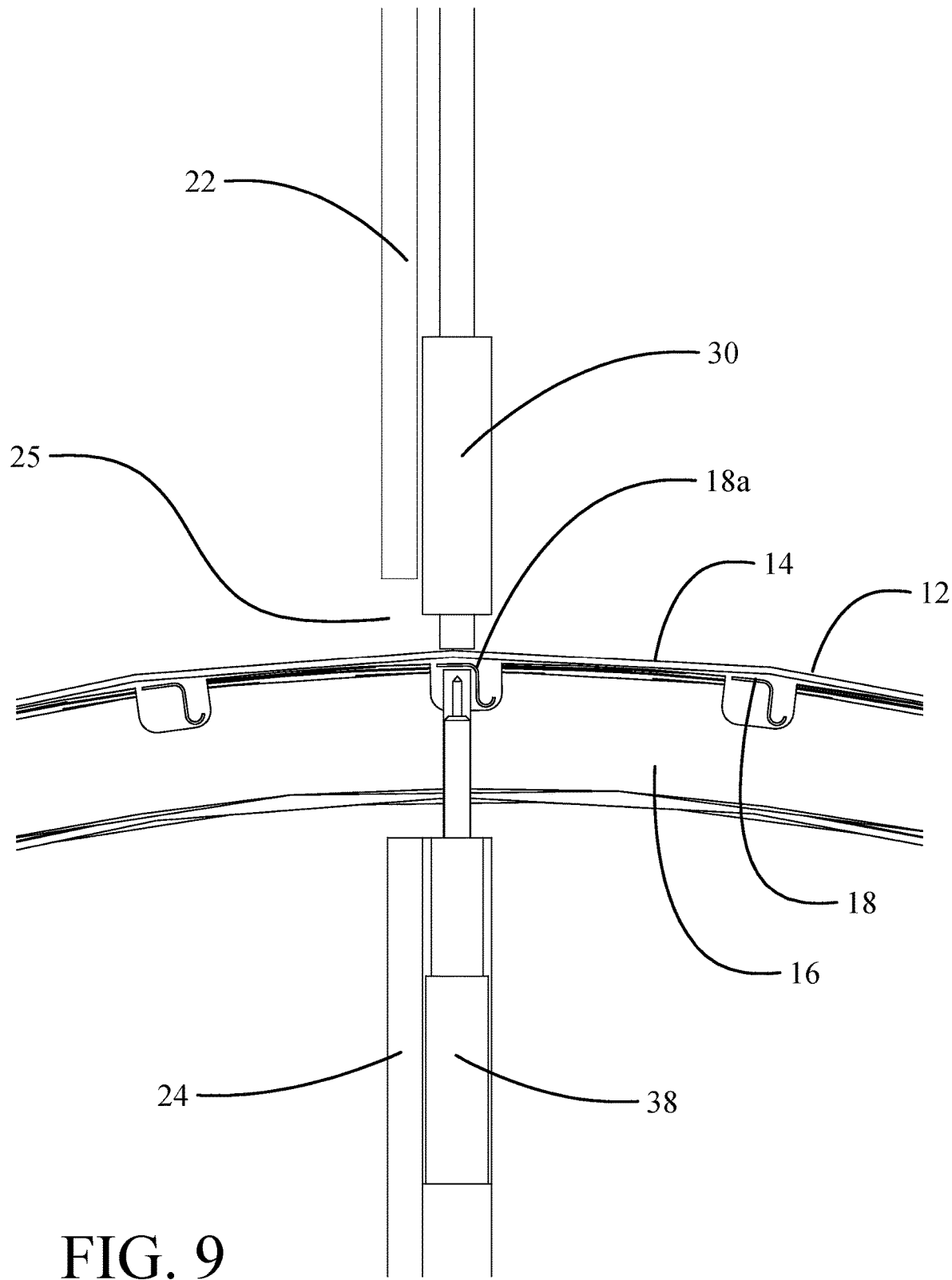
FIG. 9 is a detailed closeup of the panel positioned for drill, fill and buck.

The elements of each actuator group 26 are spaced by a pulse width 40 and each actuator group is spaced by an open width 41 equal to three pulse widths as seen in FIG. 5. Pulse width 40 is determined by design spacing of rivets in the panel 12. In exemplary implementations, spacing between the actuator groups and elements of each actuator group is determined by frame spacing to guarantee hole alignment with the frames during clocking movement. The number of pulses between the frames is driven by fastener pitch, frame spacing and fastener diameter. A typical pitch is normally 1 to 1.5 inches. In operation, the carrier inserts the panel 12 in the slot 25 to a first longitudinal alignment position with the panel 12 clocked for alignment of a selected stringer 18a with the actuator groups as seen in FIGS. 8 and 9 and located a pulse position 1. Each drill 28 in an initial plurality 27a of the actuator groups 26 drills a hole in the stringer 18 and skin 14. The rivet squeezer 32 and bucking bar 34 are not activated in position 1. The panel 12 is then pulsed one position longitudinally to position 2 and the rivet feeder 30, now aligned with the first drilled hole, inserts a first rivet. The drills 28 in the initial plurality drill a second hole. The rivet squeezer 32 and bucking bar 34 are not activated in position 2. The panel is then pulsed longitudinally one position to position 3 and the aligned squeezer 32 and bucking bar 34 engage and squeeze the first rivet. The drills 28 in the initial plurality drill a third hole and the rivet feeders 30 insert a second rivet. The panel is then pulsed longitudinally one position to position 4 and each drill 28 in the initial plurality 27a drills a fourth hole, the rivet feeders insert a third rivet and the squeezers 32 and bucking bars 34 engage and squeeze the second rivet. The panel is then pulsed to position 5 and each drill 28 drills a fifth hole while each rivet feeder 30 inserts a fourth rivet and each squeezer and bucking bar engages and squeezes the third rivet. The panel is then pulsed to position 6 and each drill 28 drills a sixth hole while each rivet feeder 30 inserts a fifth rivet and each squeezer and bucking bar engages and squeezes the fourth rivet. Note that the first, second and third rivets have been in positions 4-6 during the operations at pulses 4-6 and thereby in the open width 41 and not engaged in any operation of the actuator groups. A seventh pulse with activation of the rivet feeder and squeezer/bucking bar only for insertion of the sixth rivet and squeezing of the fifth rivet, an eighth pulse with operation of the squeezers 32 and bucking bars 34 only for squeezing of the sixth rivet completes the sequence.

Additional actuator groups 27b and 27c are shown in the example implementation (see e.g. FIG. 6) to demonstrate that various panel lengths may be accommodated by additional actuator groups for longer length panels and a reduced number (the initial plurality 27a) for shorter panels 12. The number of actuator groups 26 in the plurality of actuator groups is determined by the length 102 of the panel 12 divided by 6 pulse widths, the pulse widths determined by the design rivet spacing in the panel.

In alternative implementations for other fastener types, the rivet feeder, squeezer and bucking bar may be replaced with appropriate actuators for the fastener type such as a bolt feeder and nut torqueing system. Additionally, for alternative implementations the number of actuators in each actuator group may vary depending on the number of operations in the fabrication sequence for each fastener and the number of pulse positions will equal the number of actuators. The open width between actuator groups will similarly be equal to the number of pulse positions associated with the actuator groups. The number of excess pulses for completing the fabrication on the last inserted fastener will equal the number of actuators minus one. The individual elements of the actuator groups are modular allowing rapid exchange of actuator group element types and sizes. The upper and lower plates 22, 24 of the backbone 21 may be predrilled or have quick connect fastening systems to accommodate exchange of the actuator group elements.

Figure 10:
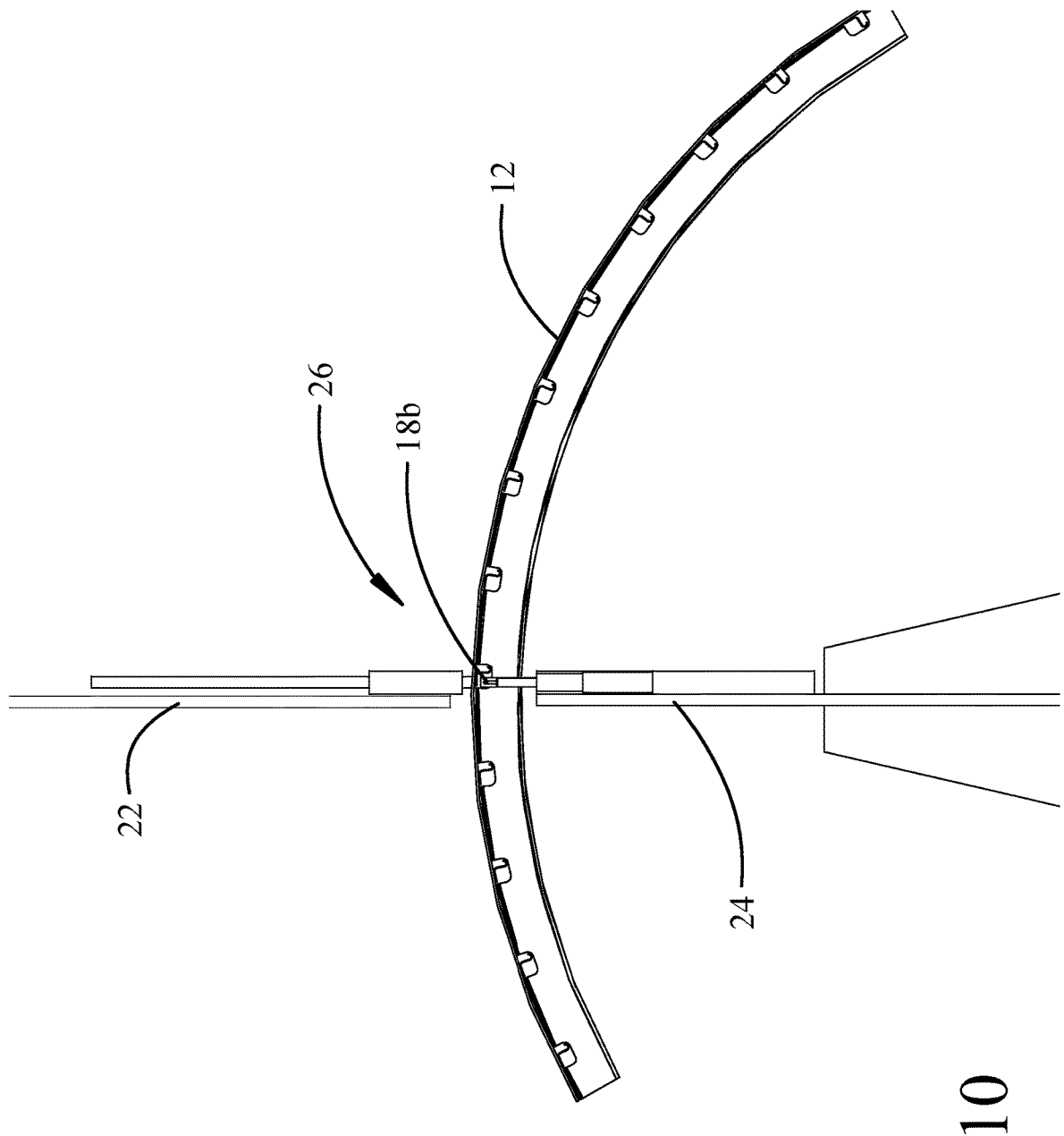
FIG. 10 is an end view of the engaged panel in a clocked position.

Upon completion of a rivet row, the panel 12 is withdrawn by 8 pulse widths and clocked to a different stringer 18b as represented in FIG. 10 and the 6 pulse sequence repeated. Upon completion of all clocking positions, the panel 12 is complete and withdrawn from the MDF machine 20.

Figure 11:
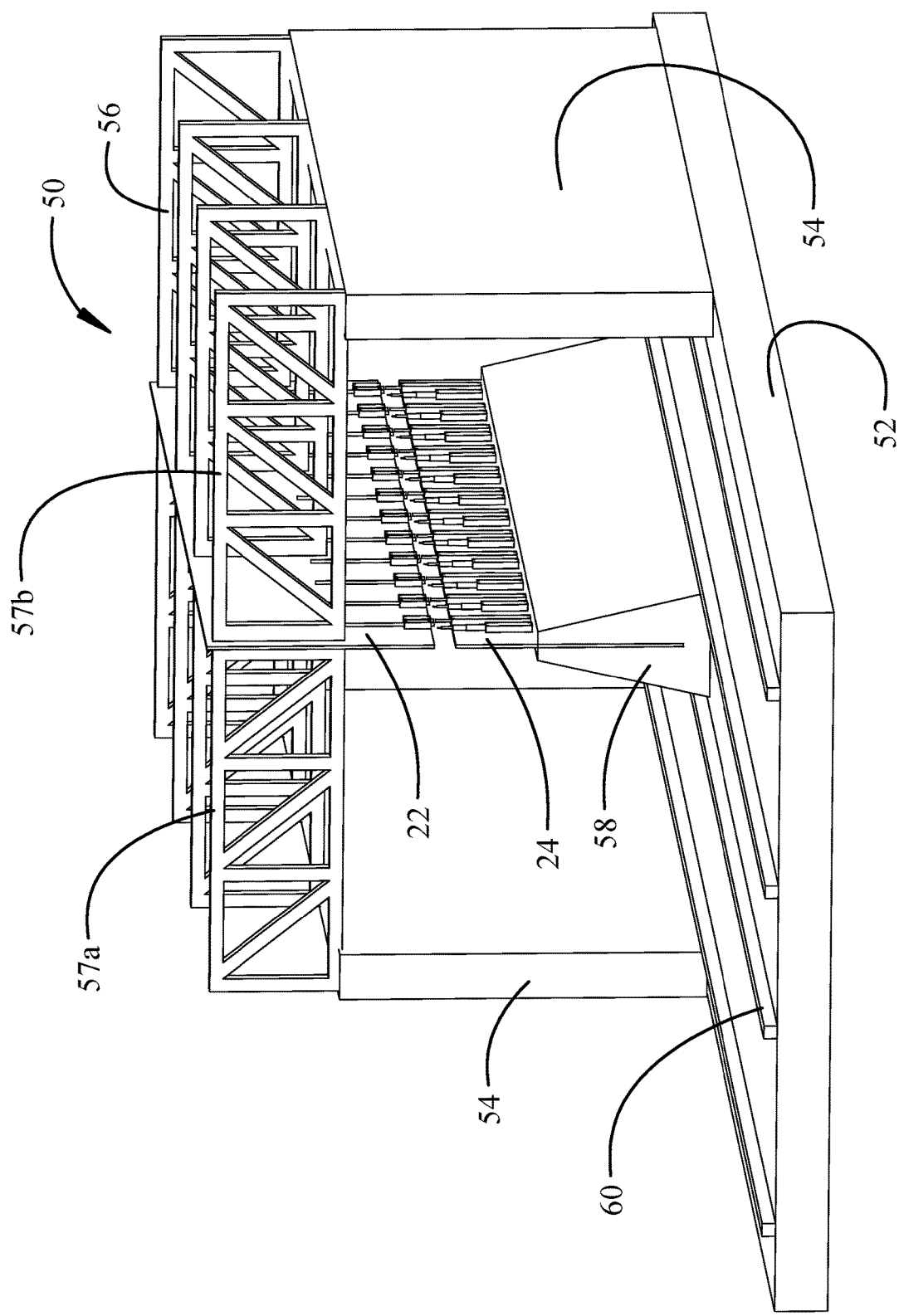
FIG. 11 is a pictorial representation of a manufacturing cell supporting the drill and fill station.

To provide support for the MDF machine 20, a fabrication cell 50 seen in FIG. 11 incorporates a concrete slab floor 52 supporting vertical concrete walls 54. A plurality of trusses 56 extend between the walls and the upper plate 22 is supported by the trusses. For the example implementation, the trusses 56 are steel with the upper plate 22 welded between opposing truss segments 57a and 57b to be suspended vertically. The lower plate 24 is supported by a concrete A pillar 58 mounted to the floor 52. A plurality of longitudinally oriented tracks 60 extend from the floor 52.

Figure 12:
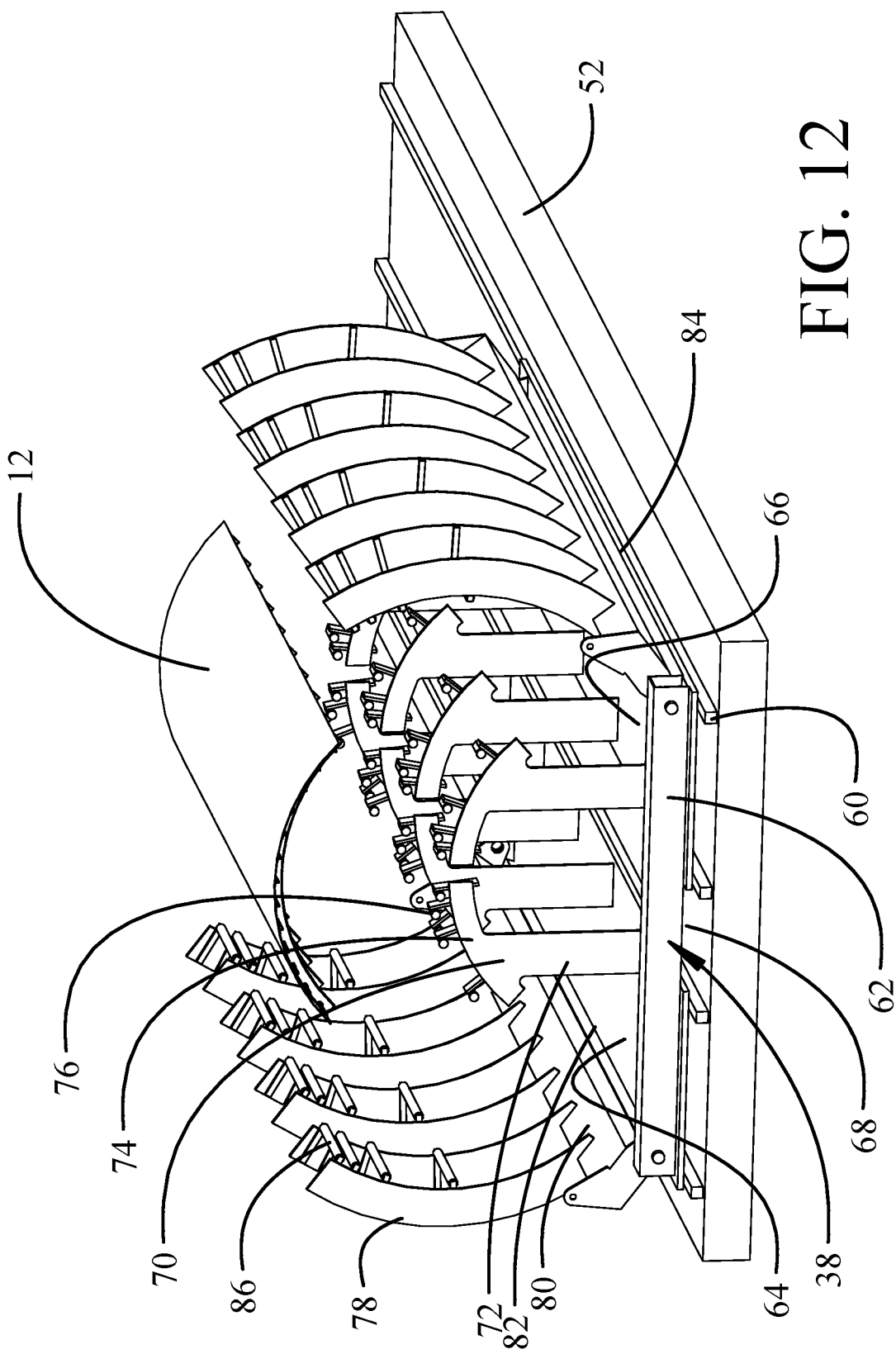
FIG. 12 is a pictorial representation of a carrier for support and positioning of the panel in the drill and fill station and cell.

FIG. 12 shows the carrier 38 which rides on the tracks 60 for longitudinal translation. A frame 62 is mounted on a base having two lateral plates 64, 66. The lateral plates 64, 66 are separated by a channel 68 sized to receive the A pillar 58, the frame 62 providing rigidity for the separated plates. A plurality of internal support fixtures 70 extend from the lateral plates 64, 66. The internal support fixtures 70 have vertical columns 72 supporting bifurcated arcuate arms 74. The arms 74 are separated by a channel 75 through which the lower plate 24 is received. 79A plurality of motorized wheel assemblies 76 extend radially outward from the arcuate arms 74. The panel 12 is received on the motorized wheel assemblies 76. The motorized wheel assemblies engage an underside of the skin 14 with wheels 77 and actuation of the wheels clocks the panel 12.

Figure 13:
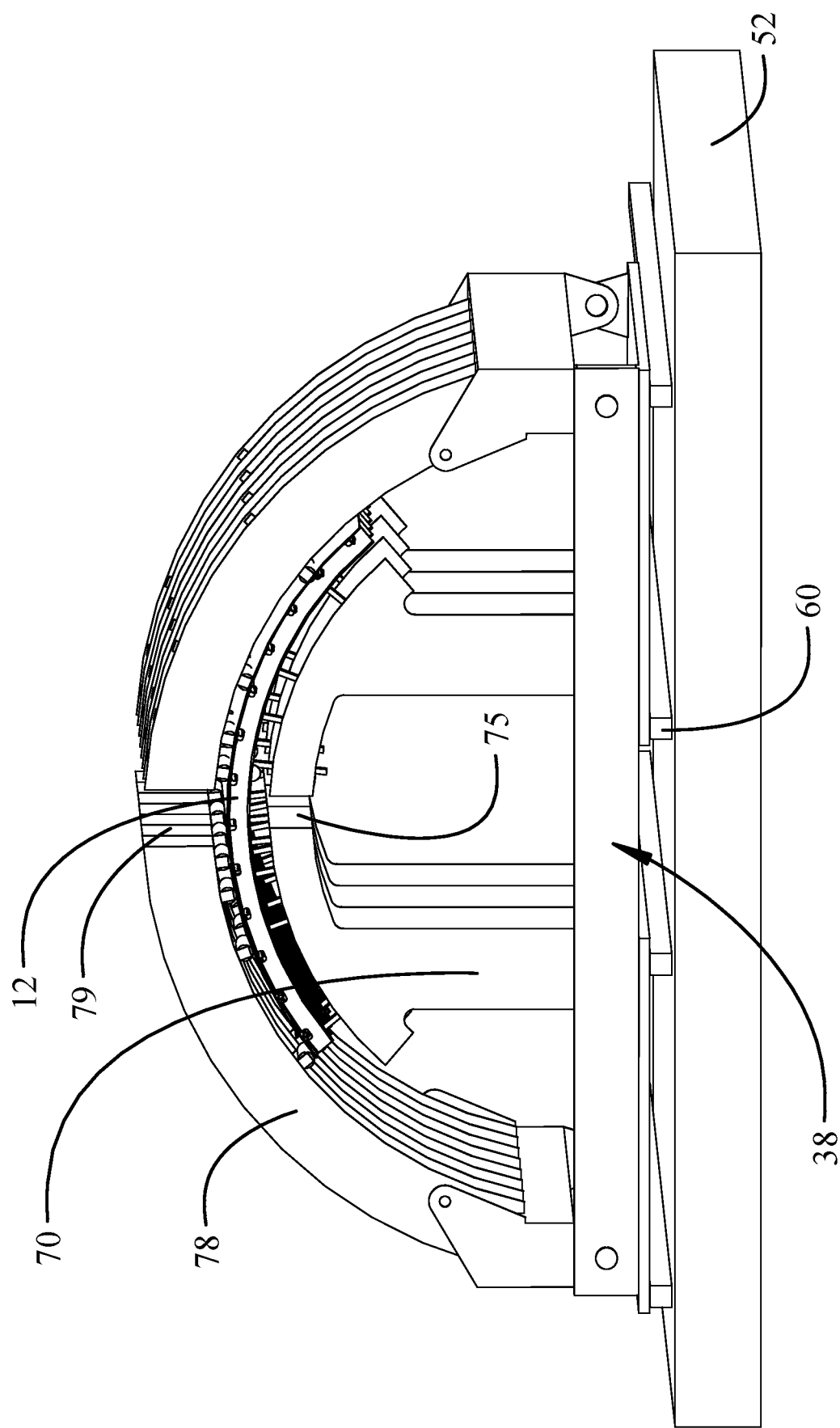
FIG. 13 is a pictorial representation of the carrier in a closed position.
Figure 14:
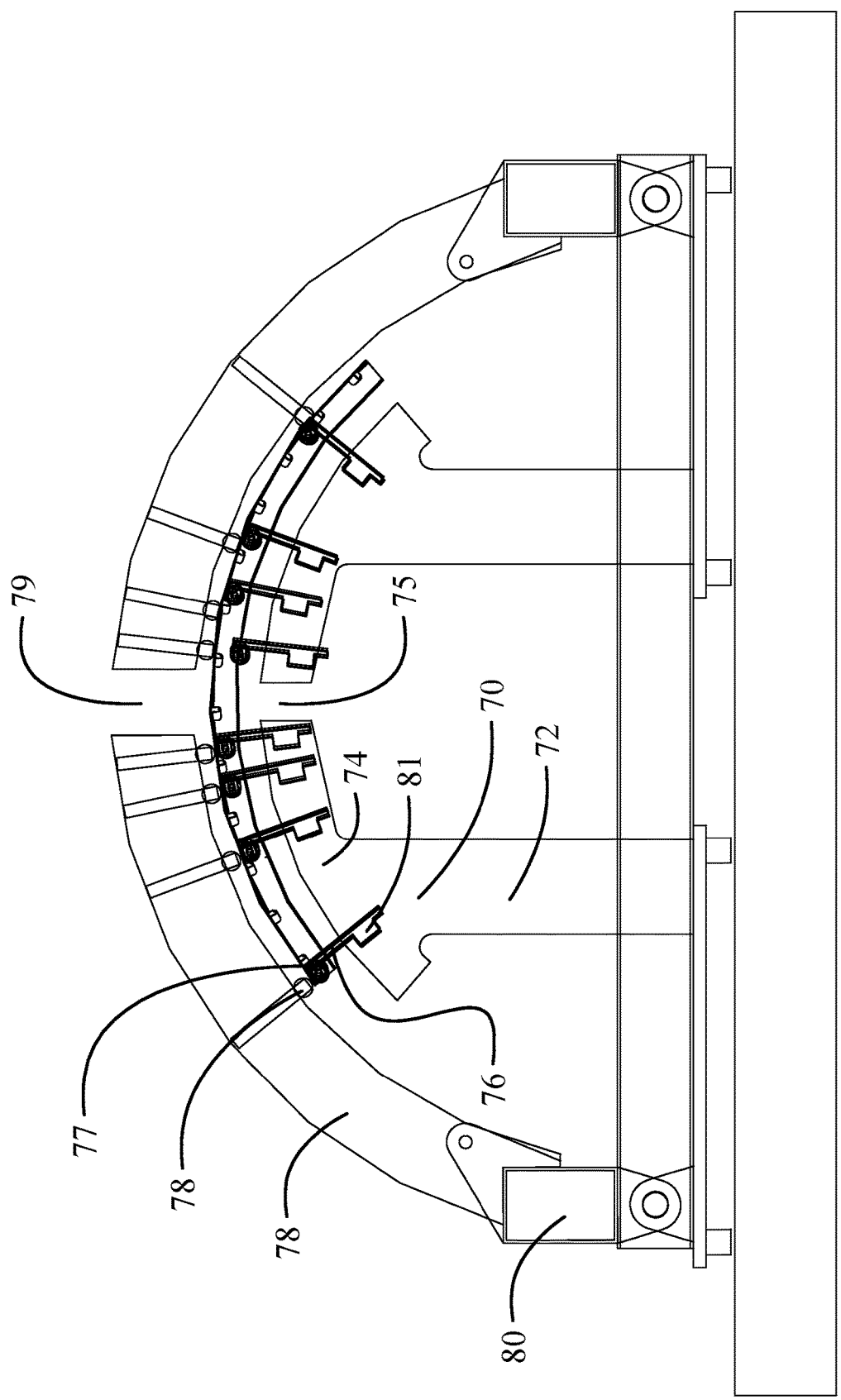
FIG. 14 is an end view of the carrier supporting a panel with details of the panel roller systems.

Arcuate external support fixtures 78 extend from frames 80 rotatably mounted to peripheral edges 82, 84 of the lateral plates 64, 66. The frames 80 are rotatable between an open position and a closed position. Pairs of external support fixtures 78 support a plurality of rollers 86 to engage an outer surface of skin 14 of the panel 12 in the closed position to act as reacting idle rollers to maintain frictional engagement by the motorized wheel assemblies 76. As seen in FIG. 12 with the external support fixtures 78 rotated to an open position, the panel 12 is inserted onto the wheel assemblies of the inner support fixtures. The external support fixtures 78 are then rotated to a closed position as seen in FIG. 13. The external support fixtures 78, when closed, maintain a channel 79 into which the upper plate 22 is received. Each motorized wheel assembly 76 is retractable on an extending arm 81 to sequentially avoid interference with the stringers 18 as the panel 12 is clocked as seen in FIG. 14. The arcuate arms 74 are longitudinally spaced to be received between the frames 16 of the panel 12.

Figure 15:
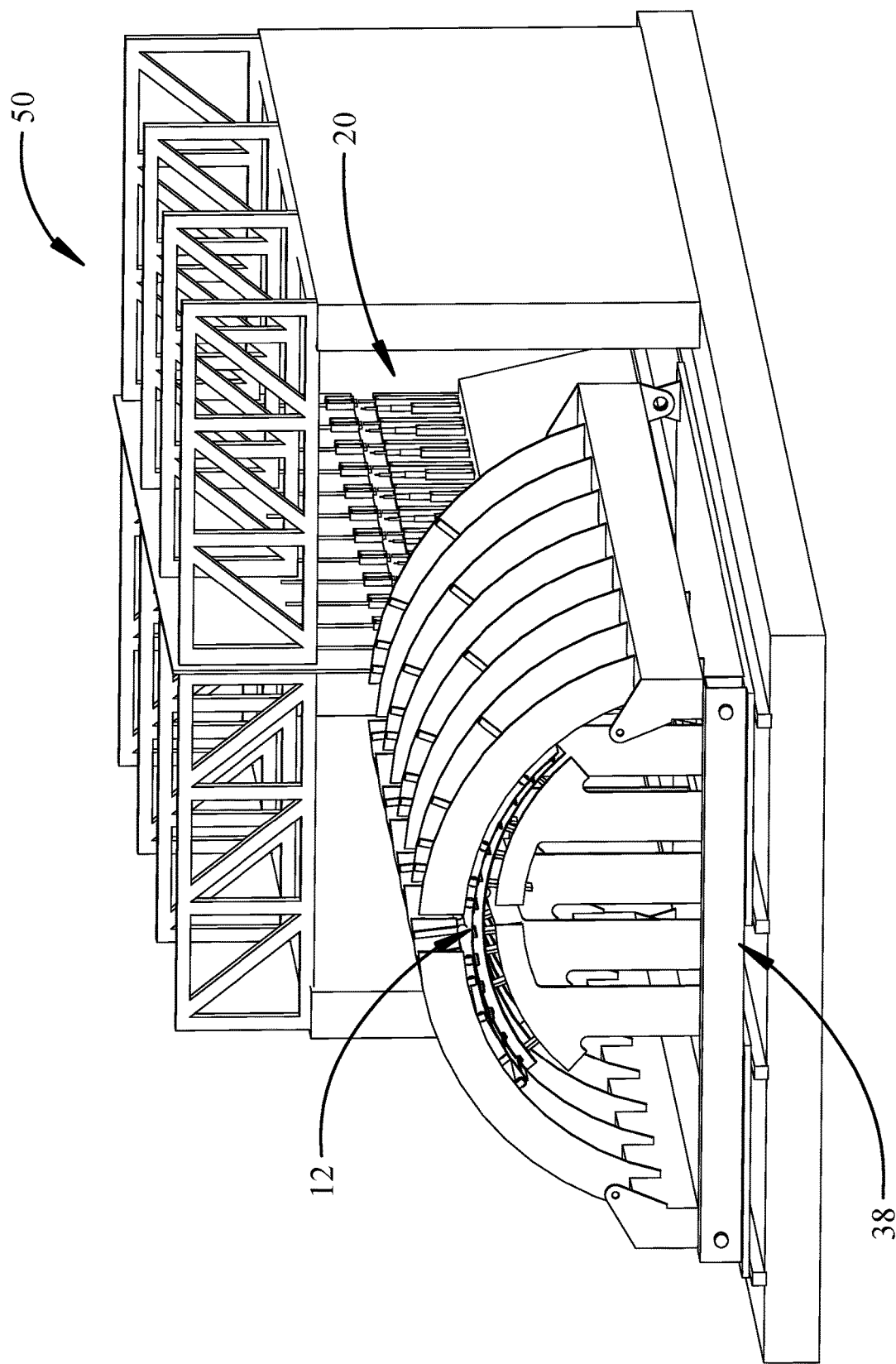
FIG. 15 is a pictorial representation of the carrier supporting the panel for entry into the cell.
Figure 16:
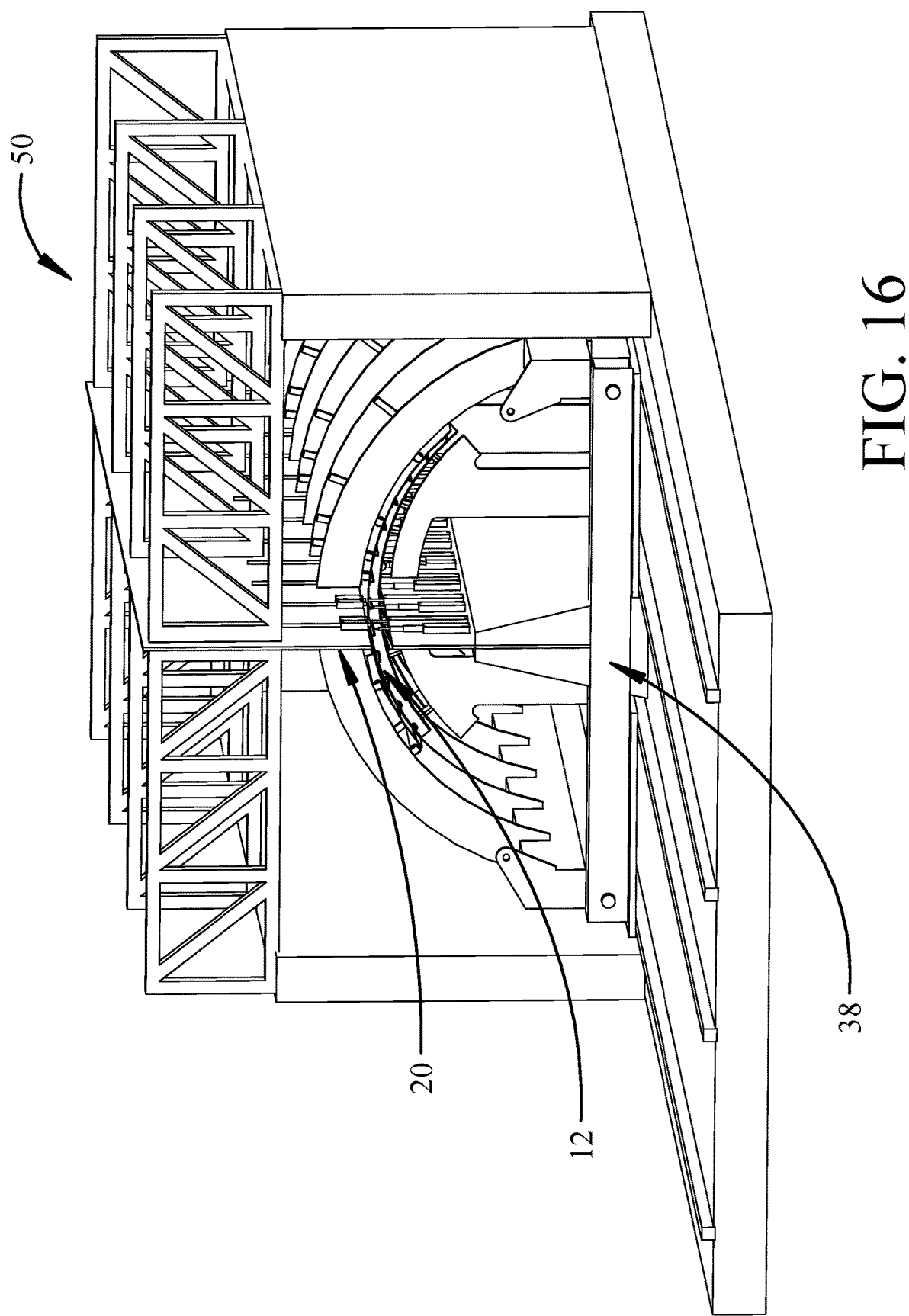
FIG. 16 is a pictorial representation of the carrier in the cell undergoing drill and fill operations.

The carrier 38 with the loaded panel 12 is then ready for longitudinal translation into the fabrication cell 50 for operations by the MDF machine 20 as seen in FIG. 15. Upon translation into the cell and MDF machine as seen in FIG. 16, the pulse operations previously described are performed. Upon completion of the riveting sequence, the carrier is withdrawn from the cell 50, the external support fixtures 78 are rotated to the open position seen in FIG. 12 and the panel 12 is removed. Longitudinal translation of the carrier 38 on the tracks 60 is accomplished by wheeled supports on the lateral plates 64, 66 or by low friction air bearings. Electric or hydraulic actuation is employed in alternative implementations for longitudinal translation and pulsing of the carrier 38 during the fabrication sequence.

Figure 17:
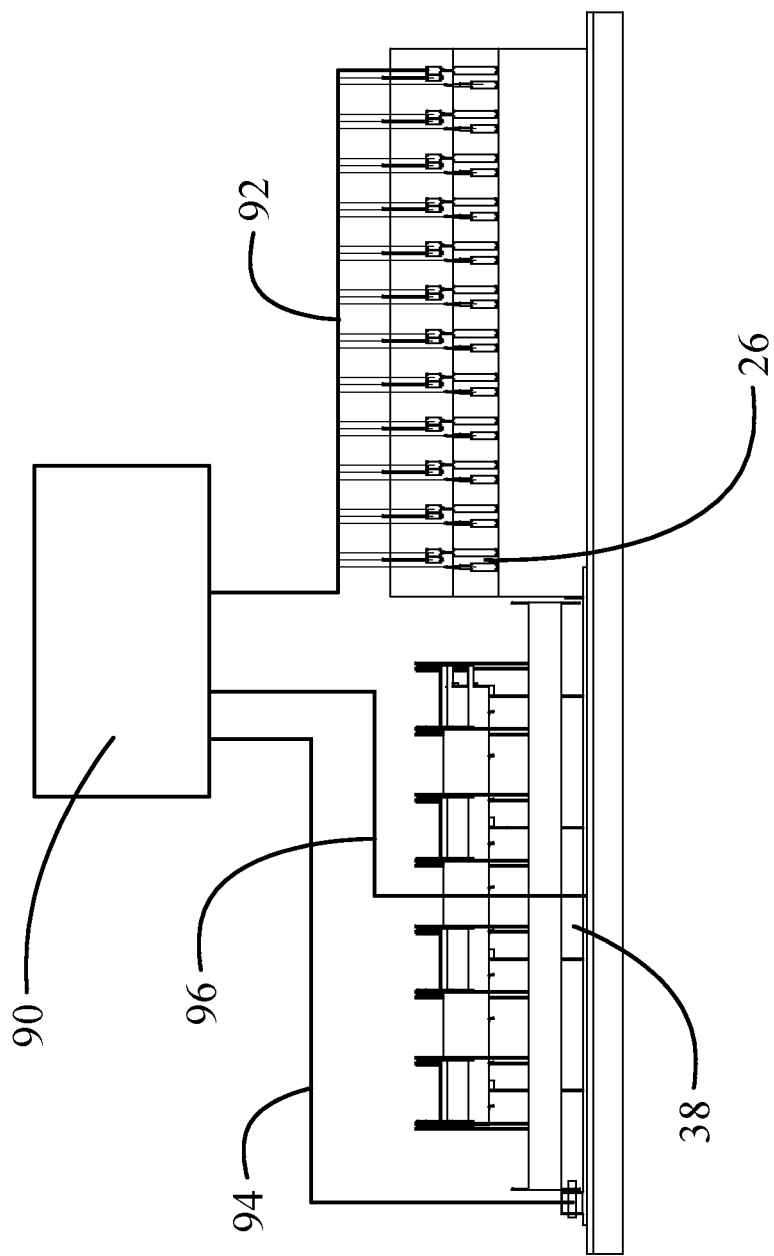
FIG. 17 is a block diagram of the control system for the actuator groups and carrier; and, FIGS. 18A and 18B are a flow chart of a method for hybrid additive manufacturing using the exemplary implementations.

Control of the elements of the example implementation is accomplished with a microprocessor based controller 90 as seen in FIG. 17. Controller 90 issues control signals to the carrier 38 and actuator groups 26 for control of the pulsed operations. As noted in the operational sequence described above, the actuator groups 26 operate in a combined manner during most pulse steps with only individual control of the elements of the actuator groups in the first 3 pulse positions and last two pulse positions. A command bus 92 to each of the actuator groups provides this functionality. The controller provides command signals 94 for opening and closing of the external support fixtures for insertion of the panel on the carrier and extraction of the panel from the carrier upon completion of fabrication. Command signals 96 are issued by the controller 90 for longitudinal translation of the carrier into and out of the cell and for coordinated pulsing of the carrier through the 8 pulse positions.

Figure 18A:
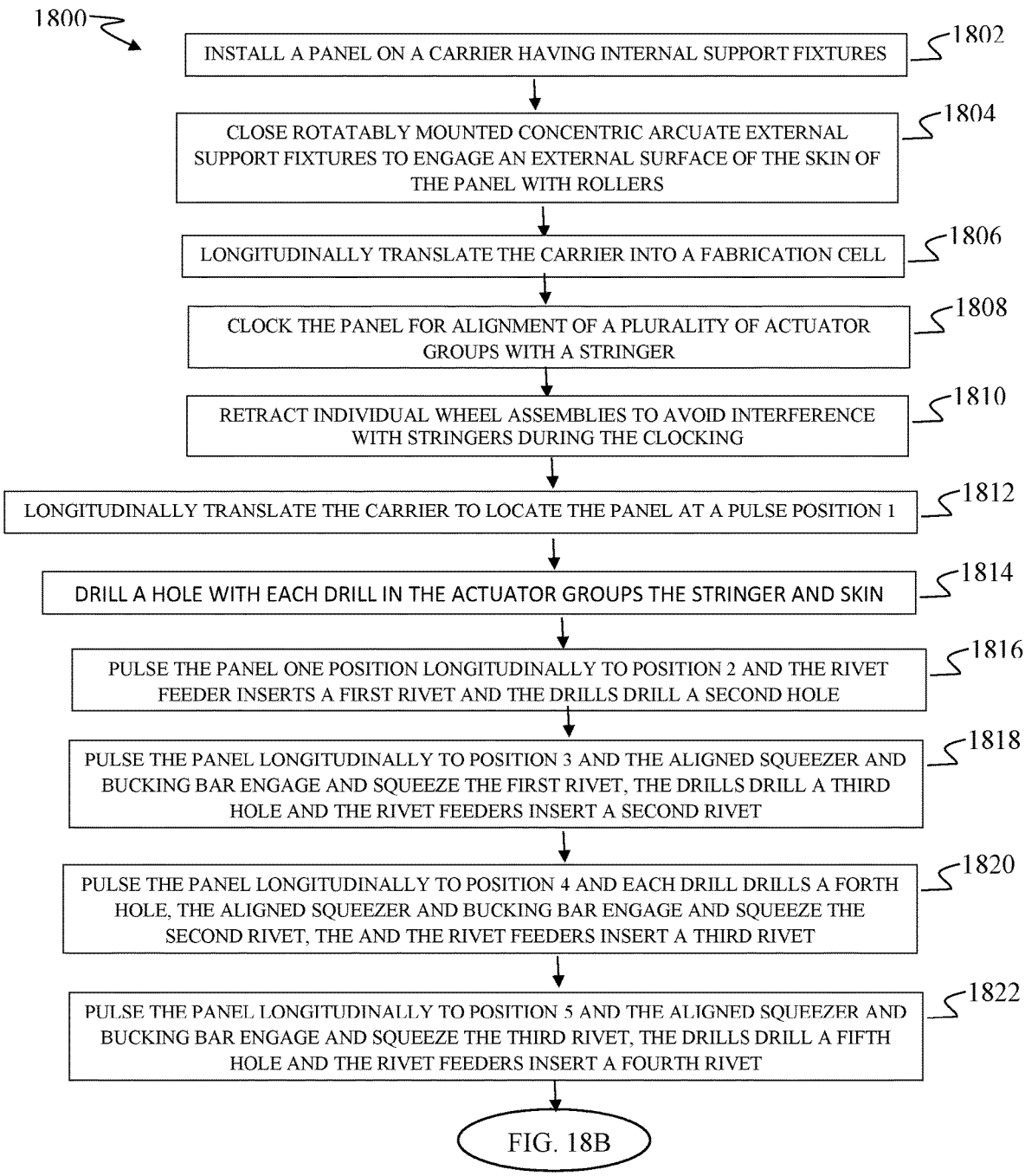
Figure 18B:
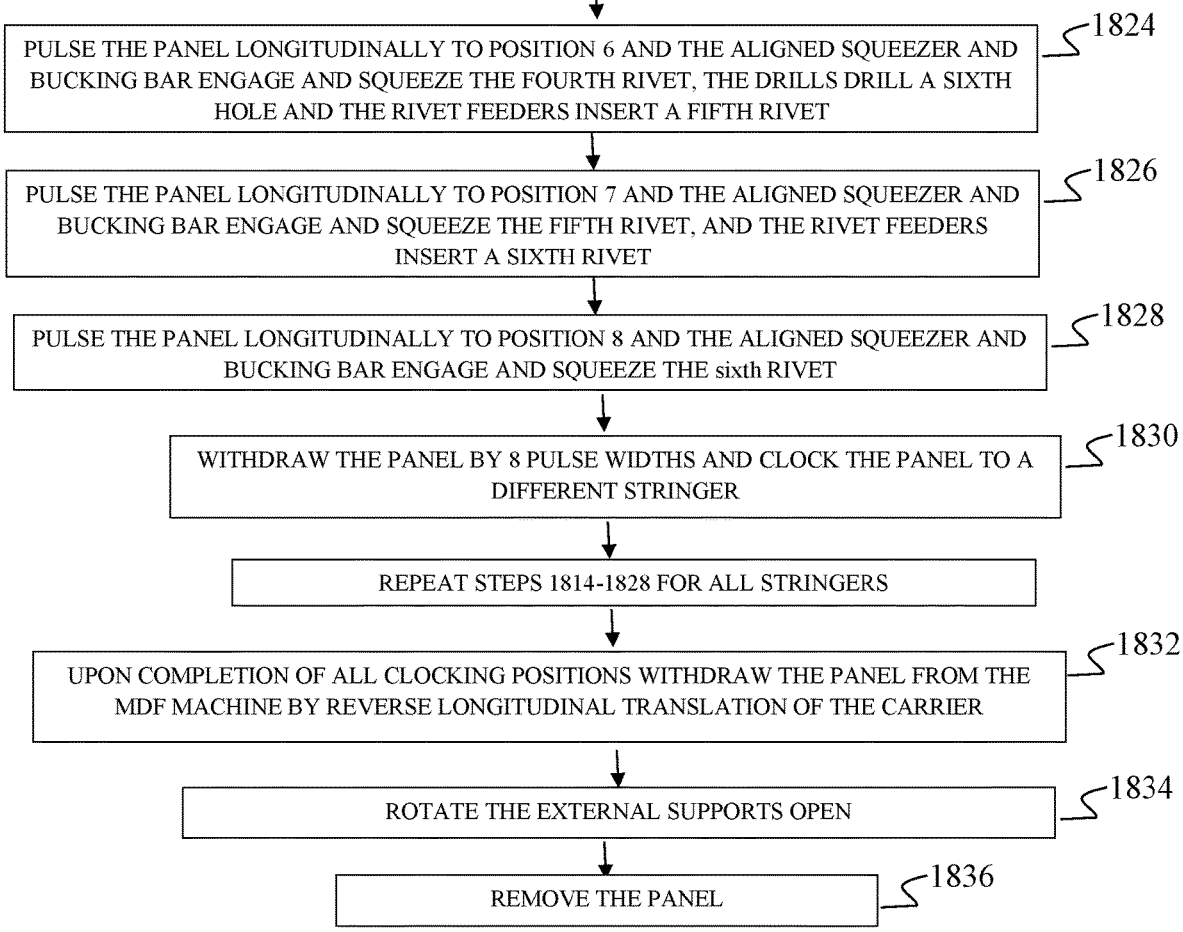

A method 1800 for fabrication of panels 12 with an MDF machine and fabrication cell 50 is shown in FIGS. 18A and 18B. A panel 12 is installed on a carrier 38 having internal support fixtures 70 with bifurcated arcuate arms 74 and radially extending motorized wheel assemblies 76 engaging an internal surface of the skin 14, step 1802. Rotatably mounted concentric arcuate external support fixtures 78 are closed to engage an external surface of the skin of the panel with rollers 86, step 1804. The carrier is longitudinally translated into a fabrication cell 50, step 1806, inserting the panel 12 in an MDF machine 20 having a bifurcated backbone 21 with a longitudinal slot 25 to receive the panel. The panel is clocked for alignment of a plurality of actuator groups 26 with a stringer 18 in the panel by driving the motorized wheel assemblies, step 1808. Individual wheel assemblies are retracted to avoid interference with stringers during the clocking, step 1810. The carrier is longitudinally translated to locate the panel at a pulse position 1, step 1812. Each drill 28 in the actuator groups 26 drills a hole in the stringer 18 and skin 14, step 1814. The rivet squeezer 32 and bucking bar 34 are not activated in position 1. The panel 12 is then pulsed one position longitudinally to position 2 and the rivet feeder 30 inserts a first rivet and the drills 28 in the actuator groups drill a second hole, step 1816. The rivet squeezer 32 and bucking bar 34 are not activated in position 2. The panel is then pulsed longitudinally one position to position 3 and the aligned squeezer 32 and bucking bar 34 engage and squeeze the first rivet, the drills 28 drill a third hole and the rivet feeders 30 insert a second rivet, step 1818. The panel is then pulsed longitudinally one position to position 4 and each drill 28 drills a fourth hole, the rivet feeders insert a third rivet and the squeezers 32 and bucking bars 34 engage and squeeze the second rivet, step 1820. The panel is then pulsed to position 5 and each drill 28 drills a fifth hole while each rivet feeder 30 inserts a fourth rivet and each squeezer and bucking bar engages and squeezes the third rivet, step 1822. The panel is then pulsed to position 6 and each drill 28 drills a sixth hole while each rivet feeder 30 inserts a fifth rivet and each squeezer and bucking bar engages and squeezes the fourth rivet, step 1824. The panel is then pulsed to position 7 with activation of the rivet feeder and squeezer/bucking bar only for insertion of the sixth rivet and squeezing of the fifth rivet, step 1826. The panel is then pulsed to position 8 with operation of the squeezers 32 and bucking bars 34 only for squeezing of the sixth rivet, step 1828. The panel 12 is withdrawn by 8 pulse widths and clocked to a different stringer 18b, step 1830. The 8 pulse sequence of steps 1814-1828 is repeated. Upon completion of all clocking positions, the panel 12 is complete and withdrawn from the MDF machine 20 by reverse longitudinal translation of the carrier 38, step 1832. The external supports are rotated open, step 1834 and the panel 12 is removed, step 1836.

Operation of the pulsing operations of the MDF machine may be approximated wherein each actuator group has a second plurality of n actuators designated $z_y$ where y=1 to n. The panel is longitudinally translated through a series of pulse positions $x_q$ where q=1 to 2n+(n−1). An operation is performed on the panel with the actuator $z_1$ at pulse position $x_1$. The panel to a next position $x_2$ and an operation with actuator $z_2$ is performed on the panel while simultaneously performing an operation of actuator $z_1$. The panel is then pulsed through all pulse positions $x_m$ where m=3 through 2n and an operation at each pulse position is simultaneously performed with all actuators $z_a$ where a=series (1 to n−m, m<n). The panel is then pulsed through all pulse positions $x_p$ where p=2n through 2n+n−1) and an operation is performed at each pulse position with all actuators $z_b$ where b=series (n to n−(p−2n)).

Operation of the MDF machine using the method described allows insertion and squeezing of up to approximately 50 rivets per minute with 10 actuator groups as shown in the example implementation. An example panel typically contains 5000 rivets allowing completion of a panel in approximately 100 minutes, which significantly improves through put over current fabrication systems.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A manufacturing system comprising:
a bifurcated backbone and a carrier;
the bifurcated backbone having a plurality of actuator groups, an upper plate and a lower plate, with a longitudinal slot between the upper plate and the lower plate;
the plurality of actuator groups mounted at spaced intervals longitudinally adjacent the longitudinal slot, each actuator group of the plurality of actuator groups having an identical plurality of actuators;
the carrier supporting a panel for longitudinal translation into the longitudinal slot and configured to pulse longitudinally in the longitudinal slot relative to the plurality of actuator groups during a sequence of fabrication operations by the plurality of actuator groups on the panel;
an identical one of the actuators in each of the identical plurality of actuators in said plurality of actuator groups operating simultaneously at a plurality of aligned longitudinal locations on the panel at each pulse.

2. The manufacturing system as defined in claim 1 wherein each actuator group in the plurality of actuator groups includes a drill, a rivet feeder and a squeezer with aligned bucking bar.

3. The manufacturing system as defined in claim 2 wherein the carrier is configured to clock the panel to a plurality of clocking positions relative to the plurality of actuator groups.

4. The manufacturing system as defined in claim 3 wherein the carrier comprises:
a base;
a plurality of internal support fixtures extending from the base, each internal support fixture having
vertical columns supporting arcuate arms, and
a plurality of motorized wheel assemblies extending radially outward from the arcuate arms, the panel received on the motorized wheel assemblies, the motorized wheel assemblies configured to clock the panel.

5. The manufacturing system as defined in claim 2 wherein the drill, the rivet feeder and the squeezer in each of the plurality of actuator groups are longitudinally separated by a predetermined pulse width.

6. The manufacturing system as defined in claim 5 wherein the plurality of actuator groups are longitudinally separated by an open width equal to three pulse widths.

7. The manufacturing system as defined in claim 6 wherein a number of actuator groups in the plurality of actuator groups equals a length of the panel divided by six pulse widths.

8. A manufacturing system comprising:
a bifurcated backbone having an upper plate and lower plate, with a longitudinal slot between the upper and lower plate;
a plurality of actuator groups mounted longitudinally adjacent the slot, wherein each actuator group in the plurality of actuator groups includes a drill, a rivet feeder and a squeezer with aligned bucking bar; and,
a carrier supporting a panel for longitudinal translation into the slot and configured to pulse longitudinally in the slot relative to the plurality of actuator groups during a sequence of fabrication operations by the plurality of actuator groups on the panel, wherein the carrier is configured to clock the panel to a plurality of clocking positions relative to the plurality of actuator groups and the carrier comprises
a base;
a plurality of internal support fixtures extending from the base, each internal support fixture having
vertical columns supporting arcuate arms, and
a plurality of motorized wheel assemblies extending radially outward from the arcuate arms, the panel received on the motorized wheel assemblies, the motorized wheel assemblies configured to clock the panel; and
a plurality of arcuate external support fixtures extending from frames rotatably mounted to the base, said frames rotatable from an open position to a closed position, wherein the external support fixtures support a plurality of rollers to engage the panel as reacting idle rollers to maintain frictional engagement by the motorized wheel assemblies.

9. The manufacturing system as defined in claim 8 wherein the panel comprises a skin supported by plurality of adhesively bonded spaced frames and longitudinal stringers and wheels in each of the plurality of motorized wheel assemblies contact an inner surface of the skin and the rollers contact an outer surface of the skin, and each motorized wheel assembly has an extending arm said extending arm retractable to sequentially avoid interference with the stringers as the panel is clocked.

10. The manufacturing system as defined in claim 9 wherein each of the plurality of clocking positions aligns a stringer with the plurality of actuator groups.

11. The manufacturing system as defined in claim 9 further comprising a fabrication cell having
    a concrete slab floor supporting vertical concrete walls;
    a plurality of trusses extending between the walls, the upper plate of the backbone supported by the trusses;
    a concrete A pillar mounted to the floor supporting the lower plate; and
    a plurality of longitudinally oriented tracks extending from the floor.

12. The manufacturing system as defined in claim 11 wherein the carrier is configured to translate longitudinally into the fabrication cell and the base comprises two lateral plates separated by a channel, the channel receiving the A pillar upon longitudinal translation of the carrier into the fabrication cell.

13. The manufacturing system as defined in claim 12 wherein the two lateral plates are supported on the tracks.

14. A method for fabrication of a panel, the method comprising:
    inserting the panel in a multi-head drill and fill (MDF) machine having a bifurcated backbone and a carrier, the bifurcated backbone having a plurality of actuator groups, with an upper plate and a lower plate with a longitudinal slot between the upper plate and the lower plate to receive the panel;
    clocking the panel for alignment of the plurality of actuator groups with a stringer in the panel, the plurality of actuator groups mounted at spaced intervals longitudinally adjacent the longitudinal slot, each actuator group in the plurality of actuator groups having an identical plurality of actuators including a drill, a rivet feeder and a squeezer with an aligned bucking bar;
    longitudinally translating the panel to a pulse position 1 with the carrier supporting the panel for longitudinal translation into the longitudinal slot and configured to pulse longitudinally in the longitudinal slot relative to the plurality of actuator groups during a sequence of fabrication operations by the plurality of actuator groups on the panel;
    operating an identical one of the actuators in each of the identical plurality of actuators in said plurality of actuator groups operating simultaneously at a plurality of aligned longitudinal locations on the panel at each pulse including simultaneously drilling a hole in the stringer and skin with each drill in the plurality of actuator groups;
    pulsing the panel one position longitudinally to a pulse position 2 and simultaneously inserting a first rivet with each rivet feeder in the plurality of actuator groups and drilling a second hole with each of the drills;
    pulsing the panel one position longitudinally to a pulse position 3 and simultaneously engaging and squeezing the first rivets with each of the squeezers and the aligned bucking bars in the actuator groups, drilling a third hole with each of the drills and inserting a second rivet with each of the rivet feeders;
    pulsing the panel one position longitudinally to a pulse position 4 and simultaneously inserting a third rivet with each of the rivet feeders and engaging and squeezing the second rivets with each of the squeezers and the aligned bucking bars; and,
    pulsing the panel one position longitudinally to a pulse position 5 and simultaneously engaging and squeezing the third rivets with each of the squeezers and bucking bars.

15. The method as defined in claim 14 wherein the step of pulsing the panel longitudinally to the pulse position 4 further includes drilling a fourth hole with each of the drills, and the step of pulsing the panel position longitudinally to the pulse position 5 further includes drilling a fifth hole with each drill and inserting a fourth rivet with each of the rivet feeders, and further comprising:
    pulsing the panel one position longitudinally to the pulse position 6 and drilling a sixth hole with each drill, inserting a fifth rivet with each of the rivet feeders and engaging and squeezing the fourth rivet with each of the squeezers and bucking bars;
    pulsing the panel one position longitudinally to a pulse position 7, activating each of the rivet feeders for insertion of a sixth rivet and engaging the squeezing of the fifth rivet with each of the squeezers and the aligned bucking bars;
    pulsing the panel one position longitudinally to a pulse position 8, operating the squeezers and the aligned bucking bars for squeezing of the sixth rivets.

16. The method of claim 15 further comprising withdrawing the panel by eight pulse widths and clocking the panel to a different stringer.

17. The method of claim 16 further comprising retracting individual wheel assemblies avoid interference with stringers during the clocking.

18. The method of claim 17 further comprising:
    installing the panel on a carrier having internal supports with bifurcated arcuate arms and radially extending motorized wheel assemblies engaging an internal surface of the skin;
    closing rotatably mounted concentric arcuate external supports to engage an external surface of the skin of the panel with rollers; and wherein the step of inserting the panel in the MDF machine comprises longitudinally translating the carrier into a fabrication cell housing the MDF machine.

19. The method of claim 18 further comprising;
    reverse longitudinally translating the carrier from the fabrication cell, and
    rotating the external supports open; and
    removing the panel.

20. A method for fabrication of a panel, the method comprising:
    inserting the panel in an MDF machine having a bifurcated backbone and a carrier, the bifurcated backbone having a plurality of actuator groups, upper plate and a lower plate with a longitudinal slot between the upper plate and the lower plate to receive the panel, the plurality of actuator groups mounted at spaced intervals longitudinally adjacent the longitudinal slot, each of the actuator groups having an identical plurality of actuators;
    the carrier supporting the panel for longitudinal translation into the longitudinal slot and configured to pulse longitudinally in the longitudinal slot relative to the plurality of actuator groups during a sequence of fabrication operations by the plurality of actuator groups on the panel;

operating an identical one of the actuators in each of the identical plurality of actuators in said plurality of actuator groups simultaneously at a plurality of aligned longitudinal locations on the panel at each pulse according to the steps of clocking the panel for alignment of a first plurality of actuator groups with a structural element in the panel on which fabrication operations will be performed, each actuator group having a second plurality of n actuators designated $z_y$, where y=1 to n;

longitudinally translating the panel through a series of pulse positions $x_q$ where q=1 to 2n+(n−1);

performing an operation on the panel with the actuator zi at pulse position $x_1$; pulsing the panel to a next position $x_2$ and performing an operation with actuator $z_2$ on the panel while simultaneously performing an operation of actuator $z_1$;

pulsing the panel through all pulse positions $x_m$ where m=3 through 2n and simultaneously performing an operation at each pulse position with all actuators $z_a$ where a=series (1 to n−m, m<n);

pulsing the panel through all pulse positions $x_p$ where p=2n through 2n+n−1) performing an operation at each pulse position with all actuators $z_b$ where b=series (n to n−(p−2n)).

* * * * *